(12) United States Patent
Liu et al.

(10) Patent No.: US 10,783,253 B2
(45) Date of Patent: Sep. 22, 2020

(54) HARDWARE STRUCTURE OF A TRUSTED COMPUTER AND TRUSTED BOOTING METHOD FOR A COMPUTER

(71) Applicants: INVENTEC (PUDONG) TECHNOLOGY CORPORATION, Shanghai (CN); INVENTEC CORPORATION, Taipei (TW)

(72) Inventors: Kun Liu, Shanghai (CN); Jiang-Tao Yuan, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 119 days.

(21) Appl. No.: 16/246,303

(22) Filed: Jan. 11, 2019

(65) Prior Publication Data

US 2020/0193029 A1    Jun. 18, 2020

(30) Foreign Application Priority Data

Dec. 13, 2018  (CN) .......................... 2018 1 1527554

(51) Int. Cl.
*G06F 21/57* (2013.01)
*H04L 9/32* (2006.01)

(52) U.S. Cl.
CPC .......... *G06F 21/575* (2013.01); *G06F 21/572* (2013.01); *H04L 9/3234* (2013.01)

(58) Field of Classification Search
None
See application file for complete search history.

(56) References Cited

U.S. PATENT DOCUMENTS

| | | | | |
|---|---|---|---|---|
| 2013/0339713 A1* | 12/2013 | Huang | ................... | G06F 21/572 713/2 |
| 2014/0068275 A1* | 3/2014 | Swanson | ............... | G06F 21/575 713/192 |

FOREIGN PATENT DOCUMENTS

| | | |
|---|---|---|
| CN | 201203868 Y | 3/2009 |
| CN | 101515316 B | 9/2011 |
| CN | 106991327 A | 7/2017 |
| CN | 108073351 A | 5/2018 |
| TW | 201818258 A | 5/2018 |

OTHER PUBLICATIONS

TW Office Action in Application No. 107145653 dated Nov. 7, 2019.

* cited by examiner

*Primary Examiner* — Stefan Stoynov
(74) *Attorney, Agent, or Firm* — Maschoff Brennan

(57) ABSTRACT

This disclosure provides a hardware structure of a trusted computer, which comprises: a trusted socket and a trusted module compatible with TPM and TPCM specifications; a trusted management module connected to the trusted socket for measuring the credibility; a firmware memory of BIOS connected to the trusted socket. A firmware memory of BMC connected to the trusted socket through a switch module. When the trusted management module is in the standby status, the trusted management module measures the credibility of the firmware memory of the BIOS and the firmware memory of the BMC according to the output signal of the trusted module inserted to the trusted socket, and the computer is allowed being turning on as the measurement is pass. This disclosure further relates to a trusted booting method for a computer.

11 Claims, 2 Drawing Sheets

HARDWARE STRUCTURE OF A TRUSTED COMPUTER AND TRUSTED BOOTING METHOD FOR A COMPUTER

CROSS-REFERENCE TO RELATED APPLICATIONS

This non-provisional application claims priority under 35 U.S.C. § 119(a) on Patent Application No(s). 201811527554.1 filed in China on Dec. 13, 2018, the entire contents of which are hereby incorporated by reference.

BACKGROUND

1. Technical Field

The disclosure relates to a computer equipment manufacturing, more particularly to a hardware structure of a trusted computer and a trusted booting method of a computer.

2. Related Art

As the information grows extremely fast, the problem about the security of the information gets more and more attention from people. Since the server is used as a device saving a large amount of data, the level of the security protection of the server should be the highest.

The TPM (trusted platform module) is a relatively new security technology for a computer, wherein the security technology is able to protect the computer from data leakage. During the booting procedure, the TPM technology detects whether the application program set up in the computer/server has been maliciously coded, and the TPM technology further prevents the application program coded maliciously from being performed. Presently, the TPM specification has been developed completely in industry and is adapted for guiding the manufacturing for every major manufacturer. However, the bug is not able to be detected from the application level, so the security still exists shortcomings.

In fact, both of the TPM specification and the TPCM specification (trusted platform control module) are implementing in industry. Since the TPM specification has been used earlier, the main cases designed in the past are often compatible with the TPM specification only rather than both of aforementioned two specifications. The TPCM specification is a new specification introduced to meet the demand of local automatic security control and is able to ensure the security of the physical links from the level of the based hardware, so the TPCM specification is able to prevent the invasion of the Trojan Horse and hackers fundamentally.

As a result, the safety of the TPCM specification is preferable and is more adaptable to the present network security environment, so the electronic equipment produced newly (such as the computer or server) is in an urgent need of being compatible with two specifications.

SUMMARY

The hardware structure of a trusted computer comprises: a trusted socket compatible with a trusted module of a TPM specification and a TPCM specification; a trusted management module connected to the trusted socket and adapted for managing a trusted measurement process; a firmware memory of a BIOS, connected to the trusted socket; and a firmware memory of a baseboard management controller, connected to the trusted socket through a switch module.

The trusted management module confirms a credibility of the firmware memory of the BIOS and a credibility of the firmware memory of the baseboard management controller according to an output signal of the trusted module inserted to the trusted socket when the trusted management module is in a standby status, and wherein the trusted management module allows the computer to start a booting procedure when the trusted management module confirms that the credibility of the firmware memory of the BIOS and the credibility of the firmware memory of the baseboard management controller are passed.

Preferably, the hardware structure of a trusted computer further comprises: a platform controller hub connected to the trusted socket and the firmware memory of the BIOS through another switch module, and a baseboard management controller connected to the switch module.

The computer loads a firmware process to the platform controller hub and the baseboard management controller respectively after the trusted management module confirms that the credibility of the firmware memory of the BIOS and the credibility of the firmware memory of the baseboard management controller are passed.

Preferably, hardware structure of the trusted computer comprises an in-place signal, a BIOS measurement completed signal and a baseboard management controller measurement completed signal; wherein the trusted management module receives the in-place signal, the BIOS measurement completed signal and the baseboard management controller measurement completed signal through a GPIO.

Preferably, the switch module is adapted for selecting the firmware memory of the baseboard management controller being connected to the trusted socket, or selecting the firmware memory of the baseboard management controller being connected to the baseboard management controller.

Preferably, the another switch module is adapted for selecting the firmware memory of the BIOS being connected to the trusted socket, or selecting the firmware memory of the BIOS being connected to the platform controller hub.

After the computer is powered on, the trusted booting method for a computer comprises the following steps:

step S1, detecting whether a trusted interface of the computer is connected to a trusted module by a trusted management module, and the computer starts a general booting procedure if the trusted interface of the computer is not connected to the trusted module;

step S2, detecting whether the trusted module matches to a TPM specification or a TPCM specification by the trusted management module;

step S3, starting the general booting procedure by the computer if the trusted module matches to the TPM specification;

step S4, only allowing the trusted module to be powered on and operated by the trusted management module if the trusted module matches to the TPCM specification;

step S5, measuring a credibility by the trusted module, starting the general booting procedure by the computer if the credibility measured is passed, and stopping executing the general booting procedure by the computer if the credibility measured is not passed.

Preferably, in the step S4, suspending an electrical power supplied from the platform controller hub to a baseboard management controller by a method of a latch timing sequence.

Preferably, in the step S4, burning a standard BIOS firmware program and a baseboard management controller firmware program into the trusted module, and measuring a credibility of a firmware memory of the BIOS and a credibility of a firmware memory of the baseboard management controller according to the standard BIOS firmware program and the baseboard management controller firmware program.

Preferably, after the trusted module is inserted to the computer, the trusted module outputs an in-place signal, a BIOS measurement completed signal and a baseboard management controller measurement completed signal to the trusted management module.

Preferably, in the step S1, the trusted management module determines whether the trusted module is included in the computer according to the in-place signal.

Preferably, in the step S2, the trusted management module determines whether the trusted module matching to the TPM specification or the TPCM specification according to the BIOS measurement completed signal and the baseboard management controller measurement completed signal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

For making the purposes and the features of this disclosure are more obvious and understandable, the specific implementation of this disclosure is further described hereinbelow with the reference to the accompanying drawings. However, this disclosure may be implemented in different forms and should not be limited to the described embodiments in this disclosure. Also, the embodiments of the present disclosure and the features in the embodiments are allowed for combination or replacement with each other in the condition of the principles are not conflicted with each other. Combining with the following descriptions, the advantages and the features of this disclosure will be clearer.

It should be noted that the drawings are in a very simplified form, and all the drawings are used a non-precise scale. Hence, the drawings are only used for an auxiliary description to the purpose in the embodiments of this disclosure in an easy, clear way.

Also, it needs to declare that, the purpose of numbering the steps is to facilitate the corresponding reference in this disclosure rather than limiting the sequence. For the individual steps which need to be emphasized its order will be described in the specific description in this disclosure.

Figure 1:
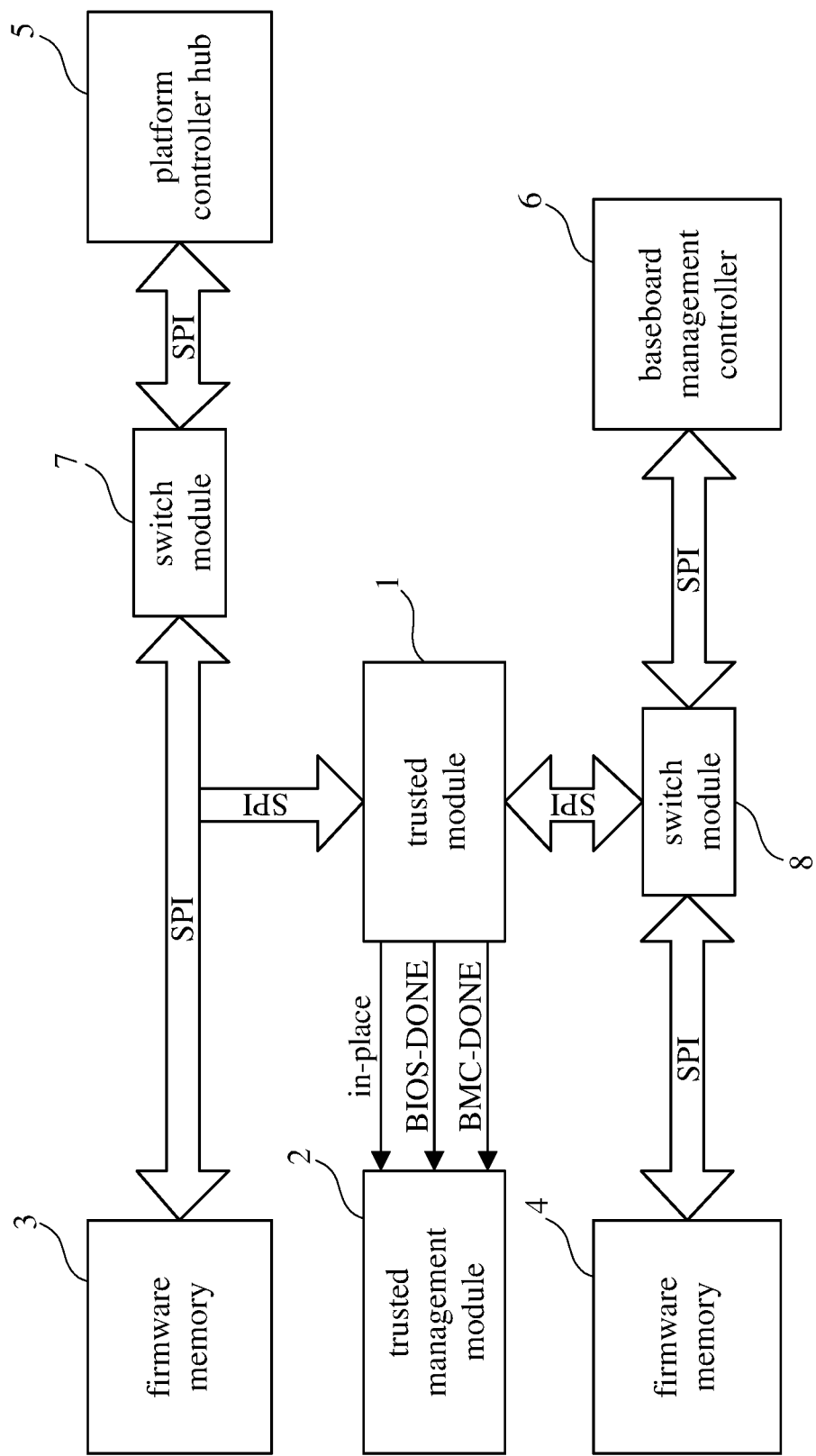
FIG. 1 is a block module diagram in an embodiment of this disclosure.

Please refer to FIG. 1, this embodiment provides a hardware structure of a trusted computer, which comprises a trusted socket adapted for being inserted with a trusted module 1 following a TPM specification or a TPCM specification, a trusted management module 2, a firmware memory 3 of a BIOS (basic input output system) and a firmware memory 4 of a BMC (baseboard management controller).

The trusted socket may be implemented in the form of 20 pins. According to the choice of customer, the trusted module 1 following the TPM specification or the TPCM specification is inserted to the trusted socket; alternatively, there is no trusted module inserted to the trusted socket.

The trusted management module 2 is connected to the trusted socket, and the trusted management module 2 is disposed on the mainboard of the computer/server generally, wherein the function of the trusted management module 2 is managing a trusted measurement process.

The firmware memory 3 of the BIOS is connected to the trusted socket.

The firmware memory 4 of the baseboard management controller is connected to the trusted socket through a switch module 8.

When the trusted management module 2 is in a standby status, the trusted management module 2 confirms a credibility of the firmware memory 3 of the BIOS and a credibility of the firmware memory 4 of the baseboard management controller according to an output signal of the trusted module 1 inserted to the trusted socket. Furthermore, when the trusted management module 2 confirms that the credibility of the firmware memory 3 of the BIOS and the credibility of the firmware memory 4 of the baseboard management controller are passed, the trusted management module 2 allows the computer to start a booting procedure.

Since the trusted module following the TPM specification and the trusted module following the TPCM specification are similar to each other considerably, some output signals are common between them. Thus, it can try to use a trusted socket for being compatible with said trusted modules. This disclosure provides a socket of the trusted module, wherein the socket follows the TPM specification or the TPCM specification. Moreover, please refer to table 1 for the descriptions about the name and the function of each pin of the socket.

TABLE 1

| Pin | Name of the pin | Description |
| --- | --- | --- |
| 1 | P3V3_STBY | Power for operation |
| 2 | P3V3_STBY | Power for operation |
| 3 | GND | Digital ground |
| 4 | Present# | In-place signal |
| 5 | SPI0_CS# | Be connected to the firmware memory connected to the baseboard management controller, the chip/slave select signal |
| 6 | SPI0_CLK | Be connected to the firmware memory connected to the baseboard management controller, the clock signal |
| 7 | SPI0_MISO | Be connected to the firmware memory connected to the baseboard management controller, the master-slave disposition signal |
| 8 | SPI0_MOSI | Be connected to the firmware memory connected to the baseboard management controller, the |

TABLE 1-continued

| Pin | Name of the pin | Description |
|---|---|---|
| 9 | IRQ# | master-slave disposition signal<br>Adapt for TPM2.0 specification, the answer signal |
| 10 | TPCM_CS# | Adapt for TPM2.0 specification, the chip/slave select signal |
| 11 | BMC_ROM_TM_DONE#/I2C_CLK | Be connected to the trusted management module and the platform controller hub, the BMC measurement completed signal |
| 12 | BIOS_ROM_TM_DONE#/I2C_SDA | Be connected to the trusted management module and the platform controller hub, the BIOS measurement completed signal |
| 13 | SPI1_CS# | Be connected to the firmware memory of the BIOS, the chip/slave select |
| 14 | Reset# | Be connected to the firmware memory of the BIOS, the reset signal |
| 15 | SPI1_MISO | Be connected to the firmware memory/trusted management module of the BIOS, the master-slave disposition signal |
| 16 | SPI1_HOLD | Be connected to the firmware memory/trusted management module of the BIOS, the latch timing sequence signal |
| 17 | SPI1_WP# | Be connected to the firmware memory of the BIOS |
| 18 | SPI1_CLK | Be connected to the firmware memory/trusted management of the BIOS, the clock signal |
| 19 | GND | Digital ground |
| 20 | SPI1MOSI | Be connected to the firmware memory/trusted management of the BIOS, the master-slave disposition signal |

It can been know from both of table 1 and FIG. 1, in this embodiment, the trusted module 1 communicates to the firmware memory 3 of the BIOS and the firmware memory 4 of the baseboard management controller through the general communication bus "SPI" (serial peripheral interface), and after the trusted module 1 sends the in-place signal, the BMC measurement completed signal or the BIOS measurement completed signal to the trusted management module 2, the trusted management module 2 determines which process the computer/server should start next.

Specifically, the trusted socket may be vacant, in other words, there may be no trusted module in the computer/server, so the computer/server is in an unsecured state. Therefore, the trusted management module 2 confirms whether the in-place signal exists firstly in the standby status; if the in-place signal is invalid, the computer/server is booted by the general booting procedure.

Since the specification performed by the trusted module 1 has uncertainty, the trusted management module 2 further needs to conform the specification performed by the trusted module 1 which is currently inserted to the trusted socket. In this embodiment, the specification performed by the trusted module 1 is recognized through using the measurement completed signal outputted after the trusted module in the TPCM specification finishes the POST (power on self-test). It means that, when both of the BMC measurement completed signal and the BIOS measurement completed signal are low level, the current trusted module 1 is determined to perform the TPM specification, and the computer/server is booted generally following the TPM specification. On the other hand, when both of the BMC measurement completed signal and the BIOS measurement completed signal are high level, the current trusted module 1 is determined to perform the TPCM specification, and the trusted module 1 continues to measure the security of the system hardware of the computer/server firstly following the TPCM specification; as the measurement is passed, the computer/server is allowed to start the general booting procedure.

Further, the hardware structure of a trusted computer further comprises: a platform controller hub 5 and a baseboard management controller 4.

The platform controller hub 5 is connected to the trusted socket and the firmware memory 3 of the BIOS through a switch module 7.

The baseboard management controller 6 is connected to the switch module 8.

After the trusted management module 2 confirms that the credibility of the firmware memory 3 of the BIOS and the credibility of the firmware memory 4 of the baseboard management controller are passed, in other words, after the computer/server passes the trusted measurement, the computer/server loads the firmware program to the platform controller hub 5 and the baseboard management controller 6 respectively from the firmware memory 3 of the BIOS and the firmware memory 4 of the baseboard management controller, thereby the computer/server is able to start the general booting procedure.

Specifically, when the computer/server does not pass the trusted measurement, the switch module 7 stops the communication between the firmware memory 3 of the BIOS and the platform controller hub 5. Hence, the platform controller hub 5 is not able to read and load the content of the firmware memory 3 of the BIOS, and the BIOS is not able to be booted. The switch module 7 enables the communication channel between the firmware memory 3 of the BIOS and the platform controller hub 5 only after the computer/server passes the trusted measurement, and the platform controller hub 5 is able to boot the BIOS according to the general booting procedure.

Similarly, when the computer/server does not pass the trusted measurement, the switch module 8 stops the communication between the firmware memory 4 of the baseboard management controller and the baseboard management controller 6. Hence, the baseboard management controller 6 is not able to read and load the content of the firmware memory 4 of the baseboard management controller, and the baseboard management controller 6 is not able to be booted commonly. The switch module 8 enables the communication channel between the firmware memory 4 of the baseboard management controller and the baseboard management controller 6 only when the computer/server passes the trusted measurement, and the baseboard management controller 6 is able to boot the baseboard management controller 6 according to the general booting procedure.

As the above descriptions, stopping the loading channel of the firmware program in the standby status is implemented through disposing the switch module in this disclosure, and it is able to stop the malicious invasions of the Trojan Horse and the hackers from the hardware level. The loading channel is able to be enabled only when the trusted module measures both the credibility of the firmware program of the BIOS and the baseboard, and the computer/server is able to be booted according to the general booting procedure.

If the computer/server is not able to pass the trusted measurement, the general process is to stop the booting procedure and to send the warning signal in order to ask the human intervention.

Further, the output signal of the trusted module 1 comprising an in-place signal, a BIOS measurement completed signal and a baseboard management controller measurement completed signal. The trusted management module 2 receives the in-place signal, the BIOS measurement completed signal and the baseboard management controller measurement completed signal through the GPIO (general purpose input output).

Figure 2:
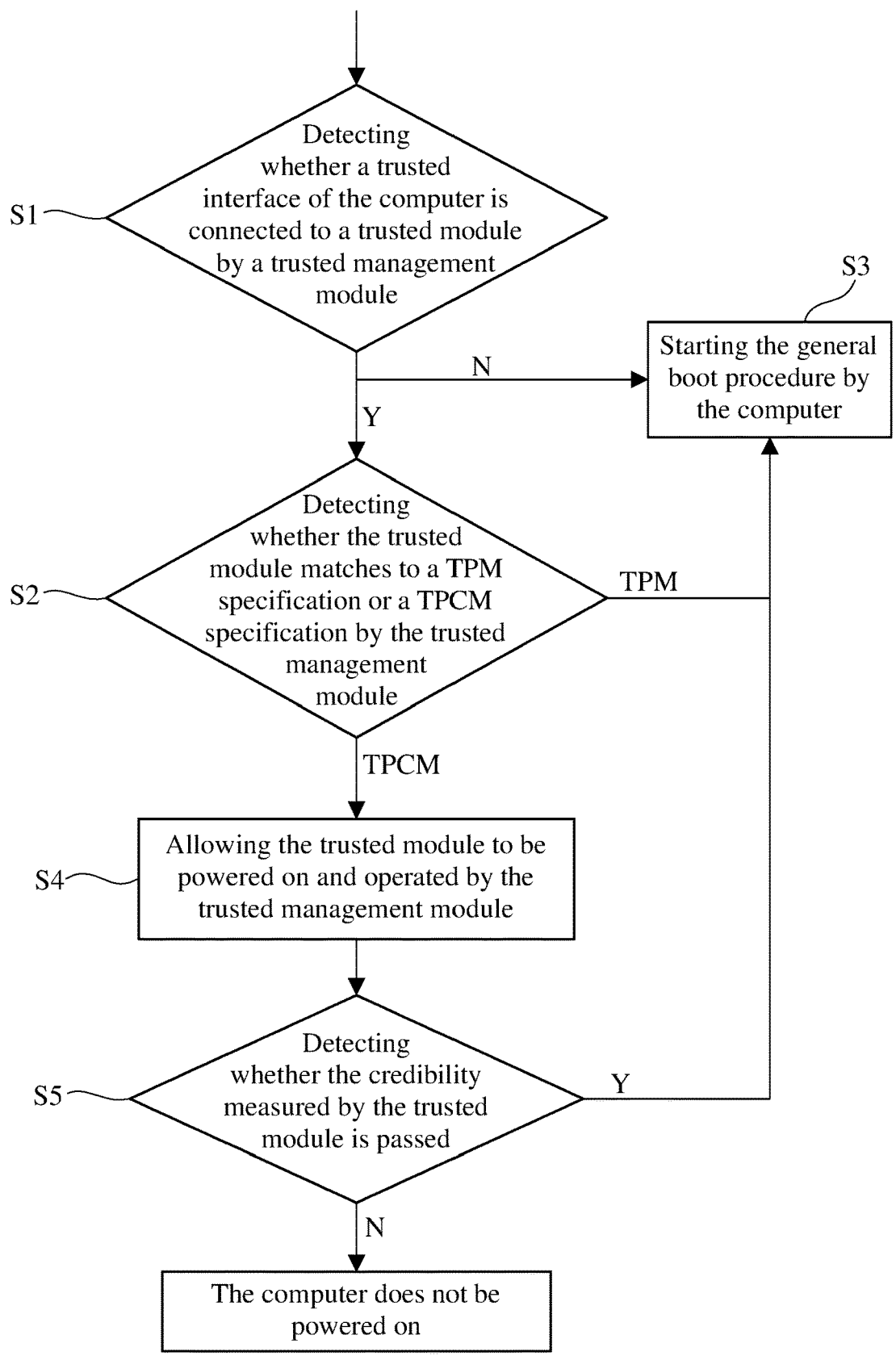
FIG. 2 is a flowchart in an embodiment of this disclosure.

Please refer to FIG. 2, a trusted booting method for a computer is further provided in this embodiment, and after the power of the computer is powered on, the method comprises the following steps:

S1, the trusted management module detects whether the trusted interface in the computer connected to the trusted module, if the trusted interface in the computer is not connected to the trusted module, the computer/server starts the general booting procedure. It means that, when there is no the trusted module protecting the computer/server currently, the trusted measurement is not needed to be performed. Aforementioned computer system is relatively original, and it is not suitable for the developing trend of the current technology of the network and the computer.

S2, the trusted management module detects whether the trusted module matches to the TPM specification or the TPCM specification.

S3, if the trusted module matches to the TPM specification, the computer/server starts the general booting procedure. More accurately, the general booting procedure herein comprises the procedure for measuring the credibility according to the TPM specification. Since the specific way for executing the TPM specification is not included in this disclosure, the corresponding description has been simplified herein.

S4, if the trusted module matches to the TPCM specification, the computer/server only allows the trusted module to be powered on and operated. It means that, at this moment, other hardware in the computer is not turned on, and there are only the trusted module and the trusted management module keeping operating in order to ensure the computer which the trusted measurement is not passed is not allowed to be turned on.

S5, the trusted module measures the credibility, if the credibility measured is passed, the computer/server starts the general booting procedure; otherwise, the computer/server stops the booting procedure.

Further, in the step 4, the platform controller hub and the baseboard management controller are paused to turn on by the method of the latch timing sequence. According to the descriptions hereinbefore, the pause executed by the method of the latch timing sequence is implemented by the switch module 7 and the switch module 8.

Further, in the step 4, the standard BIOS firmware program and the baseboard management controller firmware program are burned in the trusted module, and the credibility of the firmware memory of the BIOS and the credibility of the firmware memory of the baseboard management controller are measured according to the standard BIOS firmware program and the baseboard management controller firmware program. In fact, the standard BIOS firmware program and the baseboard management controller firmware program are able to be burned in the trusted management module. However, since the trusted module is disposed in the computer/server by a replaceable way; thus, when the firmware program in the BIOS and the firmware program in the baseboard management controller are upgraded or updated through the common way, the replaceable trusted module is convenient to update the standard firmware program simultaneously. Also, aforementioned effect is another benefit caused by the trusted socket used in this disclosure.

Further, when the trusted module in inserted to the computer, the trusted module outputs the in-place signal, the BIOS measurement completed signal and the baseboard management controller measurement completed signal to the trusted management module. Specifically, after the trusted module performing the TPM specification is inserted to the trusted socket, the in-place signal is available, and the BIOS measurement completed signal and the baseboard management controller measurement completed signal are low level. After the trusted module performing the TPCM specification is inserted to the trusted socket, the in-place signal is available. Furthermore, the BIOS measurement completed signal and the baseboard management controller measurement completed signal are low level at the beginning, and then the level is set to be high level after self-test process. When the trusted module performing the TPCM specification finishes measuring the credibility, the BIOS measurement completed signal and the baseboard management controller measurement completed signal are set to be low level. Meanwhile, the SPI communication bus of the trusted module performing the TPCM specification is set to be slave mode and does not send information or data automatically.

Further, in the step S1, the trusted management module determines whether the trusted module is in the computer according to the in-place signal.

Further, in the step S2, the trusted management module determines whether the trusted module matches to the TPM specification or the TPCM specification according to the BIOS measurement completed signal and the baseboard management controller measurement completed signal. Specifically, when the baseboard management controller measurement completed signal and the BIOS measurement completed signal are both low level, the trusted management module determines the current trusted module 1 performs the TPM specification. When the baseboard management controller measurement completed signal and the BIOS measurement completed signal are both high level, the trusted management module determines the current trusted module 1 performs the TPCM specification.

Aforementioned hardware structure of a trusted computer and trusted booting method are able to use a trusted socket to be compatible with the trusted module which is able to perform different trusted specifications for supporting both of the TPM specification and the TPCM specification. Thus, the flexibility of the configuration of the computer/server is improved, so the different requirements of the customers are able to be met, and management of the manufacturing factory is able to simplified.

Also, the trusted socket and the trusted management module in this disclosure are able to recognize what kind of the trusted module the computer or the server using currently automatically, thereby the corresponding operation is performed automatically. As a result, this disclosure provides preferable solution for the development of the trusted computer, and the solution of this disclosure is also suitable for the condition requiring higher security level in practice.

Obviously, people with the conventional skills in the related art is able to make various modifications and variations to this disclosure without departing from the spirit and the scope of this disclosure. Thus, if such modifications and variations of this disclosure fall within the scope of the claims and its equivalent technology of this disclosure, this disclosure is also intended to include these modifications and variations.

What is claimed is:

1. A hardware structure of a trusted computer, comprising:
    a trusted socket compatible with a trusted module of a TPM specification and a TPCM specification;
    a trusted management module connected to the trusted socket and managing a trusted measurement process;
    a firmware memory of a BIOS, connected to the trusted socket; and
    a firmware memory of a baseboard management controller, connected to the trusted socket through a switch module;
    wherein the trusted management module confirms a credibility of the firmware memory of the BIOS and a credibility of the firmware memory of the baseboard management controller according to an output signal of the trusted module inserted to the trusted socket when the trusted management module is in a standby status, and wherein the trusted management module allows the computer to start a booting procedure when the trusted management module confirms that the credibility of the firmware memory of the BIOS and the credibility of the firmware memory of the baseboard management controller are passed.

2. The hardware structure of the trusted computer according to claim 1, further comprising:
    a platform controller hub connected to the trusted socket and the firmware memory of the BIOS through another switch module; and
    a baseboard management controller connected to the switch module;
    the computer loads a firmware process to the platform controller hub and the baseboard management controller respectively after the trusted management module confirms that the credibility of the firmware memory of the BIOS and the credibility of the firmware memory of the baseboard management controller are passed.

3. The hardware structure of the trusted computer according to claim 2, wherein the switch module selects the firmware memory of the baseboard management controller being connected to the trusted socket, or selects the firmware memory of the baseboard management controller being connected to the baseboard management controller.

4. The hardware structure of the trusted computer according to claim 2, wherein the another switch module selects the firmware memory of the BIOS being connected to the trusted socket, or selects the firmware memory of the BIOS being connected to the platform controller hub.

5. The hardware structure of the trusted computer according to claim 1, wherein the output signal of the trusted module comprises an in-place signal, a BIOS measurement completed signal and a baseboard management controller measurement completed signal; wherein the trusted management module receives the in-place signal, the BIOS measurement completed signal and the baseboard management controller measurement completed signal through a GPIO.

6. A trusted booting method for a computer, characterized in that, after the computer is powered on, the method comprises the following steps:
    step S1, detecting whether a trusted interface of the computer is connected to a trusted module by a trusted management module, and the computer starts a general booting procedure if the trusted interface of the computer is not connected to the trusted module;
    step S2, detecting whether the trusted module matches to a TPM specification or a TPCM specification by the trusted management module;
    step S3, starting the general booting procedure by the computer if the trusted module matches to the TPM specification;
    step S4, only allowing the trusted module to be powered on and operated by the trusted management module if the trusted module matches to the TPCM specification; and
    step S5, measuring a credibility by the trusted module, starting the general booting procedure by the computer if the credibility measured is passed, and stopping executing the general booting procedure by the computer if the credibility measured is not passed.

7. The trusted booting method for the computer according to claim 6, the characteristic is that, in the step S4, suspending an electrical power supplied from a platform controller hub to a baseboard management controller by a method of a latch timing sequence.

8. The trusted booting method for the computer according to claim 6, the characteristic is that, in the step S4, burning a standard BIOS firmware program and a baseboard management controller firmware program into the trusted module, and measuring a credibility of a firmware memory of the BIOS and a credibility of a firmware memory of the baseboard management controller according to the standard BIOS firmware program and the baseboard management controller firmware program.

9. The trusted booting method for the computer according to claim 6, the characteristic is that, after the trusted module is inserted to the computer, the trusted module outputs an in-place signal, a BIOS measurement completed signal and a baseboard management controller measurement completed signal to the trusted management module.

10. The trusted booting method for the computer according to claim 9, the characteristic is that, in the step S1, the trusted management module determines whether the trusted module is included in the computer according to the in-place signal.

11. The trusted booting method for the computer according to claim 9, the characteristic is that, in the step S2, the trusted management module determines whether the trusted module matching to the TPM specification or the TPCM specification according to the BIOS measurement completed signal and the baseboard management controller measurement completed signal.

* * * * *